H. A. MATTHEWS.
Sheet-Metal Knob.
No. 212,962.  Patented Mar. 4, 1879.
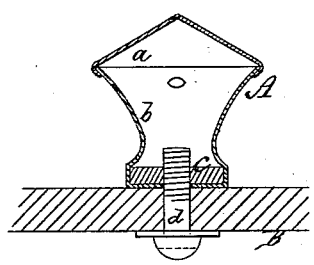
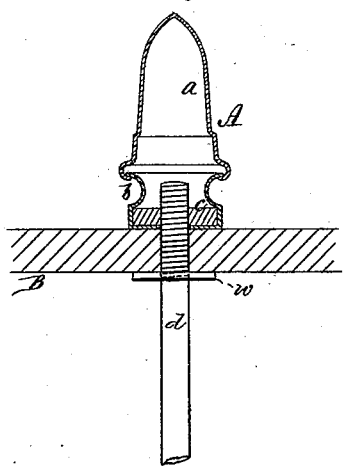
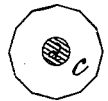
Witnesses,  Inventor,

UNITED STATES PATENT OFFICE.

HENRY A. MATTHEWS, OF WATERBURY, CONNECTICUT.

IMPROVEMENT IN SHEET-METAL KNOBS.

Specification forming part of Letters Patent No. 212,962, dated March 4, 1879; application filed September 4, 1878.

*To all whom it may concern:*

Be it known that I, HENRY A. MATTHEWS, of Waterbury, in the county of New Haven and State of Connecticut, have invented a new and useful Improvement in Sheet-Metal Knobs; and I do hereby declare that the following is a full, clear, and exact description of the same, reference being had to the accompanying drawings, making part of this specification.

This invention relates to sheet-metal knobs and ornamental heads, adapted particularly for stove-work, but applicable to other uses, and refers specially to the combination of a sheet-metal knob having an expanded base with a nut provided with polygonal or roughened edges, and set and secured in the base by forcing the sheet metal of the knob upon and over the edges of the nut in such manner as to secure the nut and knob together both angularly and longitudinally.

Figure 1 is a vertical section of the knob and screw complete. Fig. 2 is a plan view of the nut. Fig. 3 is a vertical section of an ornamental head with shank.

The knob A, Fig. 1, and ornamental head A, Fig. 3, are each made of sheet metal, shaped by the spinning or equivalent process to the contour desired. Each is usually made in two parts—viz., with a top, *a*, and base *b*, which are locked together, as shown, to form a hollow knob or head, which may be plated and polished and provided with ventilating-holes in the usual way.

To secure the knob or head in position on a door or other object a nut, *c*, is provided in the base and screwed upon a screw shank or bolt passing into or through the object.

In the preferable method of manufacture the base of the knob is stamped up to the shape of a frustum of a cone, into the large end of which a nut with roughened edges is driven, the cone put in a lathe, and the sheet metal forced down upon and over the edges of the nut by the spinning process, thus giving the base substantially the form shown in the drawings.

A polygon with a number of sides, so as to approximate to a circle, has been found to be a proper shape for the exterior of the nut to secure the objects desired. A circular nut with small indentations or projections will answer the same purpose. During the spinning process the sheet metal is forced to take the same shape as the exterior of the nut, so that the knob is locked thereto and acts efficiently as a handle or wrench to turn the nut upon the screw.

Soft metal has heretofore been cast in shape to hold a shank and fit over the polygonal base of a porcelain knob; and a sheet-metal base for a circular porcelain knob has been stamped up to receive a polygonal nut, the knob itself holding the nut longitudinally. So, also, a sheet-metal knob with expanded base has been constructed by spinning the metal of the base over a circular nut. My device differs from the latter only in the fact that I make the nut with a roughened edge, or preferably on the exterior a polygon with a sufficient number of sides to approximate a circle, by which means I am able to secure the nut and base together both angularly and longitudinally, without extra parts, by ordinary processes of manufacture, preferably by spinning.

In the manufacture of sheet-metal knobs circular nuts have been secured longitudinally in the same way that I secure my polygonal nut; but special means, such as squaring the shank and other comparatively expensive devices, have heretofore been required to secure the nut and sheet-metal knob angularly. My device is equally efficient, much more simple, and can be manufactured more cheaply, rendering the difference in construction very valuable.

If B, Fig. 1, represent a plate to which it is desired to attach a knob, it may be done by inserting a screw provided with a head (and, if desired, a washer) in a well-known way through a hole in the plate from the side opposite the knob, and then either turning the screw into the nut, when the head of the screw is convenient of access, or holding the screw and turning the nut upon the same by means of the knob.

When an ornamental head is to be attached to a rod, as in Fig. 3, a nut-washer, *w*, may be screwed on the rod to bear against the under side of plate B, and the head itself turned upon the projecting screw; or the washer *w* may be omitted, so that screwing on the head will bind together the parts through which the rod passes.

To provide for blacking the stove I prefer to put a thin nut on the rod underneath the ornamental head, so that the latter can be removed to prevent its being tarnished while the blacking is in progress. For either knob or head an ordinary spanner may be used, with a projection or projections entering one or more of the ventilating-holes, and greater force be thereby applied than when the hand is employed to turn the knob or head direct.

I claim as my invention and desire to secure by Letters Patent—

1. The combination of a sheet-metal knob or head having an expanded base with a nut provided with polygonal or roughened edges, and set and secured in the base by forcing the sheet metal of the knob upon and over the edges of the nut in such manner as to secure together the base and nut both angularly and longitudinally, substantially as and for the purposes specified.

2. A new article of manufacture, consisting of a sheet-metal knob embodying in its construction the following distinguishing features: first, a nut with polygonal or roughened edge; second, a base shaped from the sheet metal of the knob to fit over the polygonal or roughened edge of the nut; third, a shoulder formed in the sheet metal of the knob above the nut, and, fourth, a lip or flange turned from the metal of the knob below the nut, all adapted to permit the nut to be secured in the knob both angularly and longitudinally at one operation by the ordinary process of spinning, substantially as and for the purposes specified.

HENRY A. MATTHEWS.

Witnesses:
DAVID McC. IRELAND,
EDWARD F. COLE.